Patented Sept. 11, 1934

1,973,491

UNITED STATES PATENT OFFICE 1,973,491

PROCESS OF MAKING ALKALI CELLULOSE

Leon Lilienfeld, Vienna, Austria

No Drawing. Application January 11, 1921, Serial No. 436,604. In Austria September 26, 1919

18 Claims. (Cl. 260—10)

(Granted under the provisions of the act of March 3, 1921; 41 Stat. L. 1313)

For many purposes for example, for carrying out chemical reactions, such as the alkylation or aralkylation, arylation or the like of cellulose, soda celluloses are preferably employed which are homogeneous and contain only small quantities of water and a large excess of caustic alkali.

Products of this nature have, hitherto, been made by a method in which the cellulose was impregnated with a highly concentrated caustic alkali solution and the water then driven off by drying at ordinary atmospheric pressure, or in vacuo or by distillation with benzene, toluene or the like. These processes are "usually complicated" and expensive, particularly because both the cellulose on the one hand and the large amount of caustic alkali on the other, retain the water very tenaciously. Drying at high temperature is obviously prohibitive, because the cellulose would be thereby split up (depolymerized) and drying at lower temperatures necessitates a considerable amount of time and space. This is also the case to an undesired extent when the drying is affected under reduced pressure.

The present invention successfully overcomes all these disadvantages.

It consists in this, that the cellulose or cellulose-containing materials are impregnated with caustic alkali solutions or water, then pressed as far as possible and then to the pressed material the desired quantity of caustic alkali is added in the solid form, or in the form of highly concentrated solutions, or in the form of a mixture of solid caustic alkali and a concentrated (saturated) solution thereof.

The water above referred to, which is added to the cellulose as such or in the form of a caustic alkali solution, exerts a certain solvent action on some of the solid caustic alkali added in the second step, and a certain minimum amount of water is necessary in all cases to form alkali cellulose by the operation of intimately incorporating the alkali and cellulose. The minimum amount of water necessary for this purpose is generally somewhat above 10% of the entire mass during the step of incorporating, and even higher when very large excesses of caustic are to be used. If a substantially lower percentage of water were present during this step, a part of the cellulose would not combine with alkali to form alkali cellulose.

By the present process alkali celluloses very poor in water and containing any desired excess of alkali may be obtained in a quite simple manner. Experiments have shown that they are eminently suitable for chemical treatment, as for instance, alkylation or aralkylation, these operations being carried out in accordance with the teachings of the prior art, for example U. S. Patent 1,188,376, my British Patent No. 6035 of 1913 or French patent to Dreyfus 462,274. The details of operation, such as successively first partial alkylation and subsequently more complete alkylation, and the use of closed vessels, autoclaves, pressure vessels etc., and the advantages thereof, all being well known from said prior patents, do not have to be repeated here.

Example 1.—100 kilogrammes cellulose are impregnated with 500 to 1000 kilogrammes of an 18 caustic soda solution and allowed to stand for from one to three days at room temperature, (ageing operation).

The mass is then freed from the excess of alkali solution in a suitable machine such as a press, suction apparatus, or centrifuge until the residue has a weight of from 180 to 200 kilogrammes, theoretically containing 65.6 to 82 kgs. $H_2O$ and 14.4 to 18 kgs. NaOH. The residue is then finely divided by means of any suitable apparatus, e. g., a willowing machine, edge runner, or shredder, advantageously while cooling, whereupon 200 to 300 kilogrammes solid caustic soda, preferably in the form of powder, are added, either in one portion or gradually. The mass is made uniform by continued stirring, kneading, shredding or the like. If it is desired to wholly prevent any splitting up of the cellulose, then it is advisable to cool it during the incorporation of the caustic alkali.

The final product is a fine fibrous, or pulverulent, completely uniform material.

This final product may theoretically contain (with 100 parts of original cellulose)

65.6 to 82 parts of water.

14.4 to 18 parts of caustic soda (from the solution)

200 to 300 parts of caustic soda (added dry) in $\begin{Bmatrix}380\\480\end{Bmatrix}$ to $\begin{Bmatrix}400\\500\end{Bmatrix}$ parts of alkali cellulose In these four instances, the alkali cellulose theoretically has:

In 380 parts, about 17.1% $H_2O$ and about 56.4% NaOH, in 480 parts, about 13.6% $H_2O$ and about 65.5% NaOH, in 400 parts, about 20.5% $H_2O$ and about 54.5% NaOH, and in 500 parts, about 16.4% $H_2O$, and about 63.6% NaOH.

When pressing out the excess solution, the remaining solution has a somewhat greater strength than the part pressed out, hence the final products may actually contain somewhat less water and somewhat more caustic alkali than the above amounts.

*Example 2.*—100 kilogrammes cellulose is impregnated with 500 to 1000 kilogrammes of a 30% caustic soda solution and allowed to stand for a suitable period, for example, 6–48 hours, (ageing operation).

It is then pressed, separated or filtered by suction until it has a weight of 180 to 240 kilogrammes, (theoretically containing 56 to 98 kgs. $H_2O$ and 24 to 42 kgs. NaOH), and the pressed material finely divided, preferably while cooling, after which the said acustic soda, preferably in powder form is added gradually with continuous stirring, kneading, shredding, tearing and the like. The amount of added caustic soda will correspond with the amount in the previous example.

The final products of this example, when the added NaOH is 200 to 300 kilos, as in the first example, would likewise contain, theoretically, with 100 parts of cellulose, 56 to 98 parts of water (from the solution)
   24 to 52 parts of NaOH (from the solution)
   200 to 300 parts of NaOH (added dry) in $$\begin{Bmatrix}380\\480\end{Bmatrix} \text{ to } \begin{Bmatrix}440\\540\end{Bmatrix} \text{parts of alkali cellulose}$$

These four instances would theoretically show the following percentages:

In 380 parts, about 14.7% $H_2O$ and 59% NaOH, in 480 parts, about 11.6% $H_2O$ and 67.5% NaOH, in 440 parts, about 22.3% $H_2O$ and 55% NaOH, and in 540 parts, about 18.1% $H_2O$ and 63.3% NaOH.

It is to be understood that the invention is not restricted to these specific proportions and details which are given by way of example, and the proportions can be very considerably altered, within the scope of the claims.

The final product is a flocculent or pulverulent mass, which can be converted into cellulose ethers in the manner above stated.

The mechanical mixing of the cellulose with the alkali including the use of kneading or willowing machines, edge runners etc., forms the subject matter of a separate application 537,062, filed February 16, 1922 (now Patent 1,858,017). The process which comprises mixing carbohydrates with alkali and water in the proportions given herein, and subsequently etherifying, is claimed in my copending case 464,357 filed April 25, 1921 (now Patent 1,858,018).

What I claim and desire to secure by Letters Patent is:—

1. Process of producing alkali cellulose poor in water and containing an excess of caustic alkali, which process comprises first impregnating a cellulosic body with an aqueous liquid, secondly removing part of the liquid, and finally treating the residue with caustic alkali in the solid state.

2. Process of producing alkali cellulose poor in water and containing an excess of caustic alkali, which process comprises first impregnating a cellulosic body with an aqueous liquid, secondly removing part of the liquid, and finally treating the residue with a reagent containing caustic alkali in a concentrated condition.

3. Process of producing alkali cellulose poor in water and containing an excess of caustic alkali, which process comprises first impregnating a cellulosic body with several times its own weight of an aqueous liquid, secondly removing the major part of such liquid, at far below the boiling point thereof, and finally treating the residue with caustic alkali in the solid state.

4. Process of producing alkali cellulose poor in water and containing an excess of caustic alkali, which process comprises first impregnating a cellulosic body with several times its own weight of an aqueous liquid, secondly removing the major part of such liquid, while cool, and finally treating the residue with a reagent containing caustic alkali in a concentrated state.

5. Process of producing alkali cellulose poor in water and containing an excess of caustic alkali, which process comprises first impregnating a cellulosic body with a caustic alkali solution, secondly removing part of the solution, and finally treating the residue with caustic alkali in the solid state.

6. Process of producing alkali cellulose poor in water and containing an excess of caustic alkali, which process comprises first impregnating a cellulosic body with a caustic alkali solution, secondly removing part of the solution, and finally treating the residue with a caustic alkali in a concentrated condition.

7. Process of producing alkali cellulose poor in water and containing an excess of caustic alkali, which comprises impregnating cellulose-containing materials with an aqueous liquid, thereafter removing a large part of the liquid, and finally intimately mixing the residue with caustic alkali in the solid state.

8. In making alkali cellulose, mixing alkali solution and cellulose, allowing to stand, separating the excess of solution, adding solid caustic alkali and then thoroughly mixing.

9. The step of cooling a mixture of 100 parts of cellulose, not over 100 parts of water and more than 100 parts of caustic soda, while intimately incorporating the same.

10. A process of producing alkali cellulose poor in water and containing an excess of caustic alkali, which comprises impregnating cellulose-containing materials with an aqueous liquid, and after removing a large part of the liquid, intimately mixing the residue with caustic alkali in a concentrated condition.

11. A process which comprises mixing cellulose with an aqueous liquid, allowing to stand, removing the excess of such aqueous liquid, and incorporating with a caustic alkali in a concentrated state, all of such operations being conducted in the cold.

12. A process which comprises mixing cellulose with a solution of caustic alkali, allowing the mixture to stand, removing the excess of solution, and incorporating with a caustic alkali in a concentrated state, all of such operations being conducted in the cold.

13. An improvement in the manufacture of cellulose ethers which comprises incorporating cellulose and water and a caustic alkali, the cellulose and alkali being in substantially the proportions required for subsequent etherification, and the amount of water being not substantially greater than the amount needed for the etherification, and aging the alkali cellulose after the commencement of the said process, all of such operation being conducted in the cold.

14. A process which comprises mixing cellulose with a non-acid aqueous liquid not capable of reacting chemically with caustic alkali, squeezing out the excess of such aqueous liquid, and thoroughly incorporating the pressed residue with caustic alkali, the amount of water which remains being 13 to 20% and the amount of caustic alkali which remains corresponding to between 54.5 and 65.5%.

15. A process which comprises mixing cellulose with a non-acid aqueous liquid not capable of reacting chemically with caustic alkali, squeezing out the excess of such aqueous liquid, and thoroughly incorporating the pressed residue with caustic soda, the amount of water which remains from the pressing operation being between 13 and 17% of the final product, and the amount of caustic soda in the final product being between 56.4 and 65.5%.

16. A process which comprises mixing cellulose with a non-acid aqueous liquid not capable of reacting chemically with caustic alkali, squeezing out the excess of such aqueous liquid, and thoroughly incorporating the pressed residue with caustic soda, the amount of water which remains from the pressing operation being between 18 and 20% of the final product, and the amount of caustic soda in the final product being between 54.5 and 65.5%.

17. A process of making an alkali cellulose which comprises preparing an intimate and substantially uniform mixture containing cellulose and an aqueous liquid, such liquid corresponding in amount to about 56 to 98 parts of water per 100 parts of cellulose, and thereafter thoroughly incorporating with such mixture, an amount of caustic alkali considerably in excess of the other ingredients present, the amount of said caustic alkali being much greater than the maximum amount that the aqueous liquid present can dissolve.

18. A process which comprises digesting a cellulosic body with a caustic alkali solution for at least six hours, separating the excess of solution, then adding solid caustic soda equal to substantially more than the total water present, and thoroughly mixing the mass.

LEON LILIENFELD.